US006642517B1

(12) United States Patent
Ghislain et al.

(10) Patent No.: US 6,642,517 B1
(45) Date of Patent: Nov. 4, 2003

(54) METHOD AND APPARATUS FOR ATOMIC FORCE MICROSCOPY

(75) Inventors: Lucien P. Ghislain, Santa Barbara, CA (US); Virgil B. Elings, Santa Barbara, CA (US)

(73) Assignee: Veeco Instruments, Inc., Woodbury, NY (US)

( * ) Notice: Subject to any disclaimer, the term of this patent is extended or adjusted under 35 U.S.C. 154(b) by 0 days.

(21) Appl. No.: 09/491,000

(22) Filed: Jan. 25, 2000

(51) Int. Cl.⁷ ................................................ G02B 7/02
(52) U.S. Cl. .................... 250/306; 250/307; 250/368
(58) Field of Search ............................... 250/306, 307, 250/368, 363.04, 234

(56) References Cited

U.S. PATENT DOCUMENTS

| | | | |
|---|---|---|---|
| 5,144,833 A | 9/1992 | Amer et al. | |
| 5,231,286 A | 7/1993 | Kajimura et al. | |
| 5,245,863 A | 9/1993 | Kajimura et al. | |
| 5,260,824 A | 11/1993 | Okada et al. | |
| 5,294,804 A | 3/1994 | Kajimura | |
| 5,329,808 A | 7/1994 | Elings et al. | |
| 5,394,741 A * | 3/1995 | Kajimura et al. | 73/105 |
| 5,408,094 A | 4/1995 | Kajimura | |
| 5,445,011 A * | 8/1995 | Ghislain et al. | 73/105 |
| 5,497,656 A | 3/1996 | Kado et al. | |
| 5,656,769 A * | 8/1997 | Nakano et al. | 250/306 |
| 5,939,709 A | 8/1999 | Ghislain et al. | |
| 6,008,489 A | 12/1999 | Elings et al. | |
| 6,121,604 A * | 9/2000 | Hiraga et al. | 250/216 |
| 6,281,491 B1 * | 8/2001 | Kley | 250/234 |
| 6,281,495 B1 * | 8/2001 | Kitamura | 250/306 |
| 6,298,715 B1 * | 10/2001 | Thomson et al. | 250/306 |

OTHER PUBLICATIONS

*Near-field photolithography with a solid immersion lens*, Ghislain et al., American Institute of Physics, 1999, vol. 74, No. 4, pp. 501–503.

* cited by examiner

Primary Examiner—John R. Lee
Assistant Examiner—Anthony Quash
(74) Attorney, Agent, or Firm—Patterson, Thuente, Skaar & Christensen, P.A.

(57) ABSTRACT

A method of scanning probe microscopy includes using a cantilever having a planar body, generally opposed first and second ends, and a tip disposed generally adjacent the second end and extending downwardly towards a surface of a sample. Preferably, the sample is disposed on a support surface. The method includes directing a beam of light onto the second end in a direction substantially parallel to the support surface. In operation, the second end directs the beam towards a detector apparatus at a particular angle. Then, the method monitors a change in the angle of deflection of the beam of light caused by deflection of the cantilever as the cantilever tip traverses the surface of the sample, the change being indicative of a characteristic of the surface. Preferably, the second end includes a flat reflective surface, with the flat reflective surface being generally non-planar with respect to the planar body of the cantilever. In addition, the flat reflective surface comprises a mirror fixed to the second end, while in another embodiment, the flat reflective surface is microfabricated integrally with the cantilever.

22 Claims, 7 Drawing Sheets

METHOD AND APPARATUS FOR ATOMIC FORCE MICROSCOPY

BACKGROUND OF THE INVENTION

1. Field of the Invention

The present invention pertains to atomic force microscopy, and specifically, to an apparatus and method for sensing the deflection of a cantilever of an atomic force microscope.

2. Description of the Prior Art

Atomic force microscopy is directed to sensing the forces between a sharp stylus or tip of, for example, a probe and the surface of a sample to be investigated. The interatomic forces between the two cause a displacement of the tip mounted on the end of a cantilever, and this displacement is indicative of surface characteristics, e.g., topography, of the sample.

An atomic force microscope (AFM) is an apparatus capable of observing these surface characteristics of the sample, which can be on the atomic scale. In one mode of AFM operation, the probe is moved close to the sample surface, and a Van der Waals attractive force acts between an atom at the tip of the probe and an atom on the sample surface. If both atoms move close to each other, so as to nearly contact, a repulsive force occurs therebetween due to the Pauli exclusion principle. The attractive and repulsive forces between the atoms are very weak, typically about $10^{-7}$ to $10^{-12}$ N, and thus can be difficult to detect.

In general, the AFM probe is positioned a distance from the sample surface that is within a range in which the cantilever is deflected by the inter-atomic force on the probe tip. Then when the probe is scanned along the sample surface, the distance between the probe and the sample varies depending upon the configuration of the sample surface and, accordingly, the amount of deflection of the cantilever varies. Typically, this movement of the probe tip follows the topography of the sample surface. This variation in deflection of the cantilever is detected, and feedback control is effected by use of a fine movement element, such as a piezoelectric element, to return the amount of deflection of the cantilever to an initial, set point value. Based on the voltage applied to the piezoelectric element by the feedback system in response to the displacement of the probe tip, an image of the surface configuration of the sample can be obtained.

Typically, the cantilever employed in the AFM, or magnetic force microscope (MFM), or other scanning probe microscope (SPM) or profiler is a beam that is fixed at one end and free to bend at the other end. The dimensions (length, width, thickness) and Young's modulus determine the spring constant which may be selected to ensure that the cantilever exhibits high responsiveness to weak inter-atomic or magnetic forces such that the system is sensitive to cantilever deflection. Notably, various techniques have been employed to detect this cantilever deflection. In particular, various tip sensors are known in the prior art and include those that utilize tunneling currents, optical interferometry, or optical lever, etc. An AFM implemented with a tunneling sensor includes a probe having a sharply pointed tip that is attached to a spring-like cantilever beam to scan the topography of a surface to be investigated. The attractive or repulsive forces occurring between the atoms at the apex of the tip and those of the surface result in small deflections of the cantilever beam, as described above. The deflection may be measured by a tunneling microscope, which includes an electrically conductive tunnel tip that is disposed from the sample surface a particular distance. In operation, a tunneling current is measured as the tunnel tip is scanned over the sample surface. Variations in the tunneling current are then monitored, with the variations being indicative of cantilever beam deflection. Using these beam deflection measurements in conjunction with known characteristics of the cantilever, the tunneling sensor determines the forces between the tip and the surface under investigation. An AFM implemented with a tunneling sensor is described by G. Binnig et al, in Phys. Rev. Lett., vol. 56, No. 9, March 1986, pp. 930–933.

Alternatively, optical methods may be implemented. For example an AFM implemented with a laser interferometer can be used to measure the tip displacement. See, generally, G. McClelland et al., entitled "Atomic Force Microscopy: General Principles and a New Implementation", Rev. Progr. Quart. Non-destr. Eval., Vol. 6, 1987, p. 1307, and Y. Martin et al., entitled "Atomic Force Microscope-Force Mapping and Profiling on a Sub 100-A scale", J. Appl. Phys., vol. 61, no. 10, May 15, 1987, pp. 4723–4729. Laser interferometers utilize optical beam splitters to separate a laser beam into a plurality of beam components which includes the primary beam components of interest, and a photosensor to detect an interfering component of the primary beam components. This interfering component is indicative of cantilever displacement. The advantages of optical detection over tunneling detection include increased reliability and ease of implementation, insensitivity to the roughness of the beam, and a smaller sensitivity to thermal drift.

Another optical deflection method includes using an optical lever in conjunction with a laser beam directed towards the back of the cantilever. Notably, to achieve good sensitivity with the optical lever, the incident angle of light on the reflective surface of the probe with respect to the longitudinal axis of the cantilever should be large, with the best sensitivity theoretically occurring when the angle of incidence is 90°. The sensitivity falls off with the sine of the angle of incidence, and drops to zero when the angle of incidence is zero. Importantly, for known optical lever systems which reflect the light beam off the back of the cantilever, it is necessary to place the laser directly above the cantilever. Such an arrangement is disclosed in U.S. Pat. No. 5,497,656.

FIG. 1 shows a schematic representation of an AFM 1 having a conventional cantilever beam deflection apparatus 2 for detecting the deflection of a probe assembly 3 as a tip 4 of the probe assembly interacts with a surface 5 of a sample 6. Notably, sample 6 is mounted on a scanner 7 which moves sample 6 to allow AFM 1 to scan surface 5. Probe assembly 3 includes a substrate 8 having a cantilever 9 extending therefrom, while tip 4 extends from the free end of cantilever 9. Deflection apparatus 2 includes a laser 10 for directing a beam of light downwardly towards the top surface of cantilever 9 in a direction generally perpendicular to sample surface 5. During operation, cantilever 9 reflects the laser beam towards a mirror 12 which directs the beam through a collecting lens 13 and towards a position sensing detector 14. Optical beam deflection detection apparatus 2 then measures the position of the deflected light beam which is indicative of the deflection of the cantilever. The deflection of cantilever 9 is a measure of the interaction force between tip 4 and surface 5 of sample 6. Although this straight-forward arrangement is useful in some applications, in many applications (for example, near-field scanning optical microscopy, discussed below), the arrangement shown in FIG. 1 has significant disadvantages.

For example, it is known to combine an AFM with a conventional optical microscope to aid in alignment of the laser beam on the back of the cantilever and to provide a view of the surface features of the sample. Notably, high performance microscope objectives have a short working distance and must be positioned close to the sample surface. High resolution optical imaging is therefore difficult to implement in combination with the optical lever (or an interferometer) because there is not enough room for both the laser source and/or beam and a high-performance microscope objective. A similar problem exists with near-field scanning optical microscopy when using a solid immersion lens and a microscope objective. See, for example, U.S. Pat. No. 5,939,709 to Ghislain et al. and entitled "Scanning Probe Optical Microscope Using a Solid Immersion Lens," which is expressly incorporated herein by reference. Some systems have attempted to overcome this limitation by directing a laser through the microscope objective, or by providing multiple reflective surfaces and a photodetector positioned so as to accommodate the microscope objective. However, such systems have significant drawbacks including, in the case of the former system, increased noise with attendant poor image quality, and in the latter system, unreliable detection and alignment problems due to an increased path length of the reflected light. Alternatives to detection using optical beam deflection have been attempted, including using strain gauges and resistive elements disposed on the cantilever, but each has achieved little, if any, practical success due to substantial noise effects that compromise the integrity of the images produced.

In view of the above-noted shortcomings, the state of the art of atomic force microscopy was in need of a system that provides reliable cantilever deflection and accommodates various cantilever designs and related imaging apparatus. A system which could accommodate a high performance microscope objective, while providing reliable force feedback control of the cantilever, would be particularly desirable.

SUMMARY OF THE INVENTION

The preferred embodiments of the present invention obviate the above-noted problems by providing an optical deflection detection apparatus that directs light from a source disposed at a position other than superjacent to the cantilever, and by providing an efficient light directing element on the free end of the cantilever to minimize noise effects and maximize deflection sensitivity. The preferred embodiments take advantage of the discovery that deflection of the cantilever can be detected equally well from a position essentially in-line with the end of the cantilever (as well as from other locations) as from a position above the cantilever. The light directing element of the cantilever has a reflecting surface that is disposed at an angle relative to the longitudinal axis of the cantilever beam. The preferred embodiment therefore permits the deflection detection apparatus to be positioned at any of a plurality of locations relative to the cantilever. As a result, the apparatus can be configured to provide clearance above the cantilever to make room for an objective lens of an optical microscope, or to combine the AFM with a near-field scanning optical microscope, or to provide a space for other instrumentation or hardware, or optical or other access to the sample without compromising the noise performance of the AFM.

According to a first aspect of the preferred embodiment, a method of scanning probe microscopy includes using a cantilever having a planar body, generally opposed first and second ends, and a tip disposed generally adjacent the second end and extending towards a surface of a sample. Preferably, the sample is disposed on a support surface. Next, the method includes directing a beam of light onto the second end in a direction substantially parallel to the support surface. In operation, the second end directs the beam towards a detector apparatus at a particular angle. The method monitors a change in the angle of deflection of the beam of light caused by deflection of the cantilever as the cantilever tip traverses the surface of the sample, the change being indicative of a characteristic of the surface.

According to another aspect of the preferred embodiment, the second end includes a flat reflective surface, with the flat reflective surface being generally non-planar with respect to the planar body of the cantilever. In one embodiment, the flat reflective surface comprises a mirror fixed to the second end, while in another embodiment, the flat reflective surface is microfabricated integrally with the cantilever.

According to yet another aspect of the invention, a method of scanning probe microscopy includes using a cantilever having a planar body, generally opposed first and second ends, and a tip disposed generally adjacent to the second end. In this embodiment, the tip preferably extends towards the surface of a sample disposed on a support surface. This method then involves directing a beam of light towards the second end in a direction substantially non-perpendicular to the support surface, whereby the second end directs the beam towards a detector. The method monitors a change in an angle at which the directed beam impinges upon the detector, the change caused by deflection of the cantilever in response to interaction between the tip and the sample surface.

According to a further aspect of the preferred embodiment, a deflection detection apparatus for a scanning probe microscope includes a cantilever having (1) a planar body having top and bottom surfaces, (2) generally opposed first and second ends, and (3) a tip disposed generally adjacent the second end and extending towards a surface of a sample. Again, the sample preferably is disposed on a support surface. The apparatus also includes a light source to direct a beam of light towards the second end in a direction substantially parallel to the support surface, with the second end including a light directing element to direct the beam. Next, a detector is included to sense the directed beam, wherein a change in an angle at which the directed beam contacts the detector is indicative of a deflection of the cantilever.

According to another aspect of the invention, a scanning probe optical microscope for imaging a surface of a sample disposed on a support surface includes a cantilever having a generally planar body and opposed fixed and free ends, the cantilever including a solid immersion lens made of a high index of refraction material. The solid immersion lens has a first surface to receive light and a second surface forming a probe tip. The solid immersion lens optically images the sample surface so as to generate an optical image signal. The microscope also includes a force feedback apparatus having (1) a light source that directs a beam of light towards the free end in a direction generally non-perpendicular to the support surface, the free end including a light directing element to direct the beam, and (2) a detector that receives the directed beam and generates a feedback signal indicative of a change in the angle at which the directed beam impinges upon the detector. Preferably, the optical image signal and the feedback signal are generated simultaneously.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFFERED EMBODIMENTS

Figure 1:
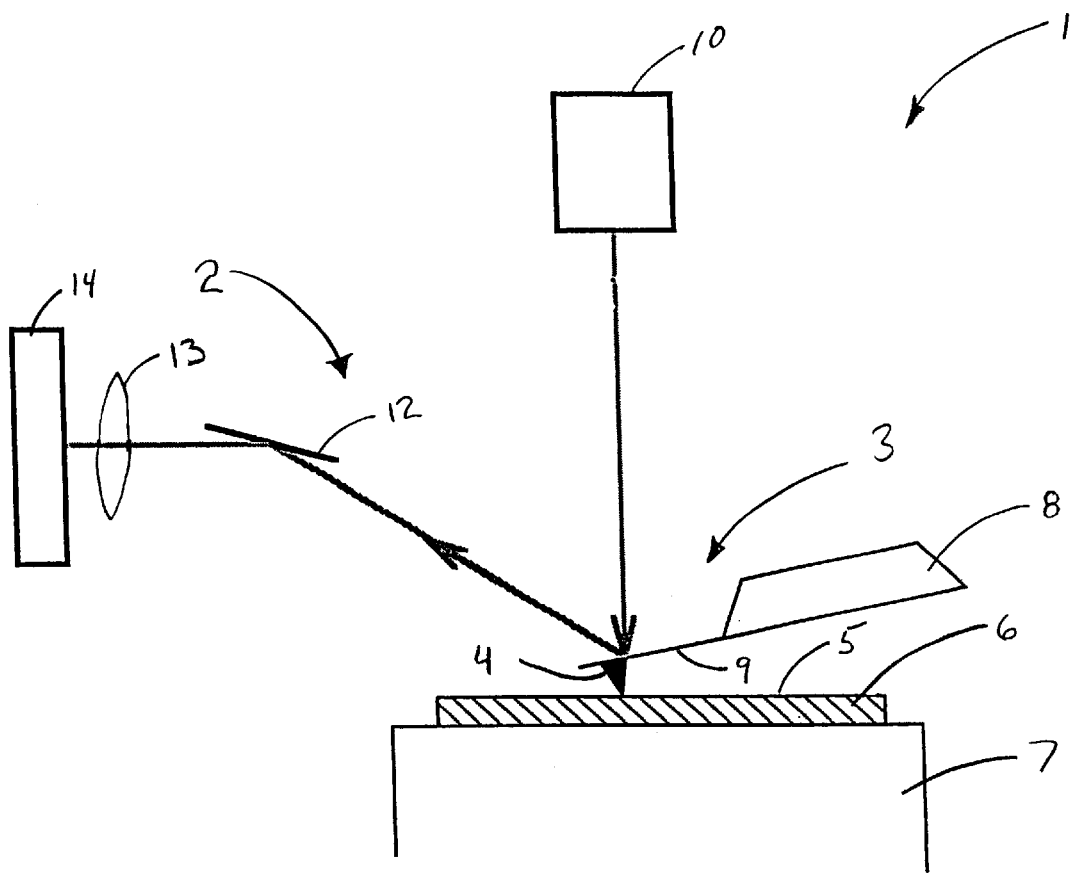
FIG. 1 is a partially broken away schematic view of a conventional atomic force microscope.
Figure 2:
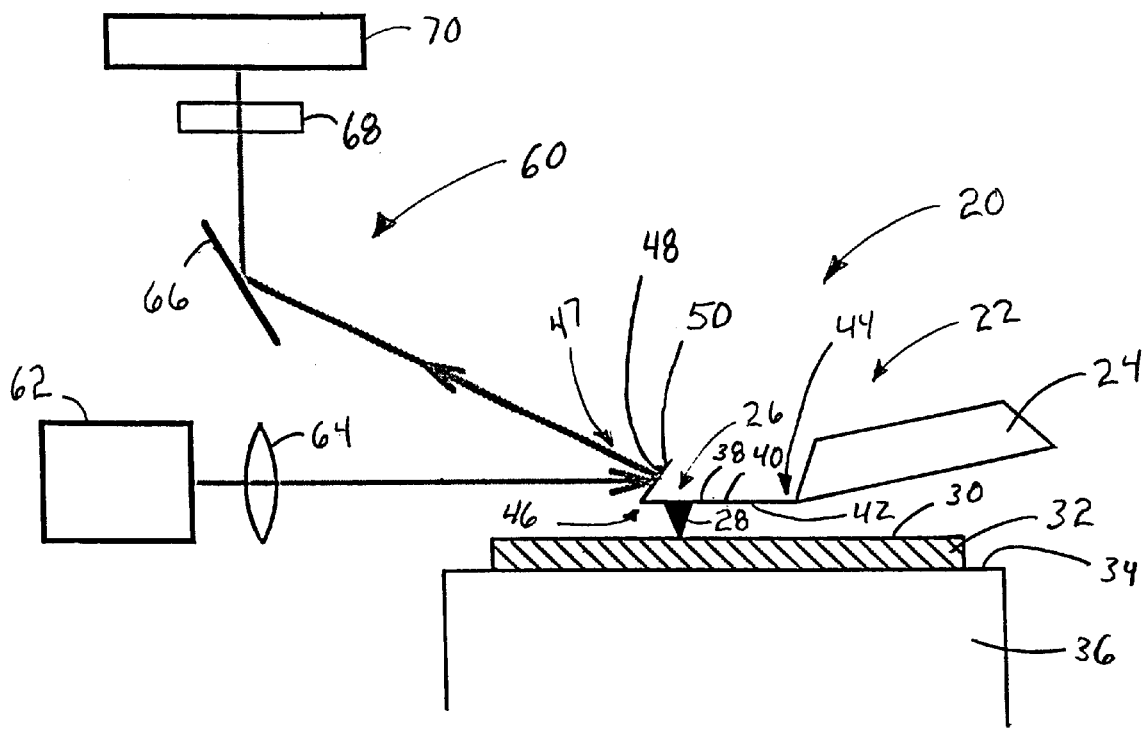
FIG. 2 is a partially broken away schematic view of a preferred embodiment of the present invention.

Turning initially to FIG. 2, an AFM 20 of the preferred embodiment includes a probe assembly 22 including a cantilever 26 having a tip 28 extending downwardly therefrom to interact with surface 30 of a sample 32. Sample 32 is placed on a support surface 34 of a scanner 36 which causes movement of sample 32 so as to allow tip 28 to scan surface 30 and image, for example, the topography. Cantilever 26 has a planar body 38 having a top surface 40 and a bottom surface 42, and includes a first, fixed end 44 and a second, free end 46. Fixed end 44 of cantilever 26 is mounted to a substrate 24, while tip 28 is mounted generally adjacent second end 46. Notably, cantilever 26 can be microfabricated so as to have a length on the order of 100 microns, thus facilitating atomic resolution.

Scanner 36 is preferably a piezoelectric tube, but can be a stack of piezo-elements in combination with a mechanical flexure (not shown). Notably, a scanner could be mechanically coupled to substrate 24 to manipulate the position of cantilever 26 for scanning and imaging surface 30 of sample 32.

As tip 28 interacts with surface 30 of sample 32 in contact, non-contact or TappingMode™ (a trademark of Veeco Instruments Inc.), cantilever 26 deflects according to the characteristics associated with surface 30. A deflection detection apparatus 60 is used to sense this deflection. Detection apparatus 60 includes a light source 62 such as a laser that directs light through a focusing lens 64 that focuses the laser beam onto a reflecting surface 48 at second end 46. Reflecting surface 48 thereafter directs the light towards a beam steering mirror 66 that further directs the light toward a positioning-sensing detector 70 via a collecting lens 68.

Figure 3:
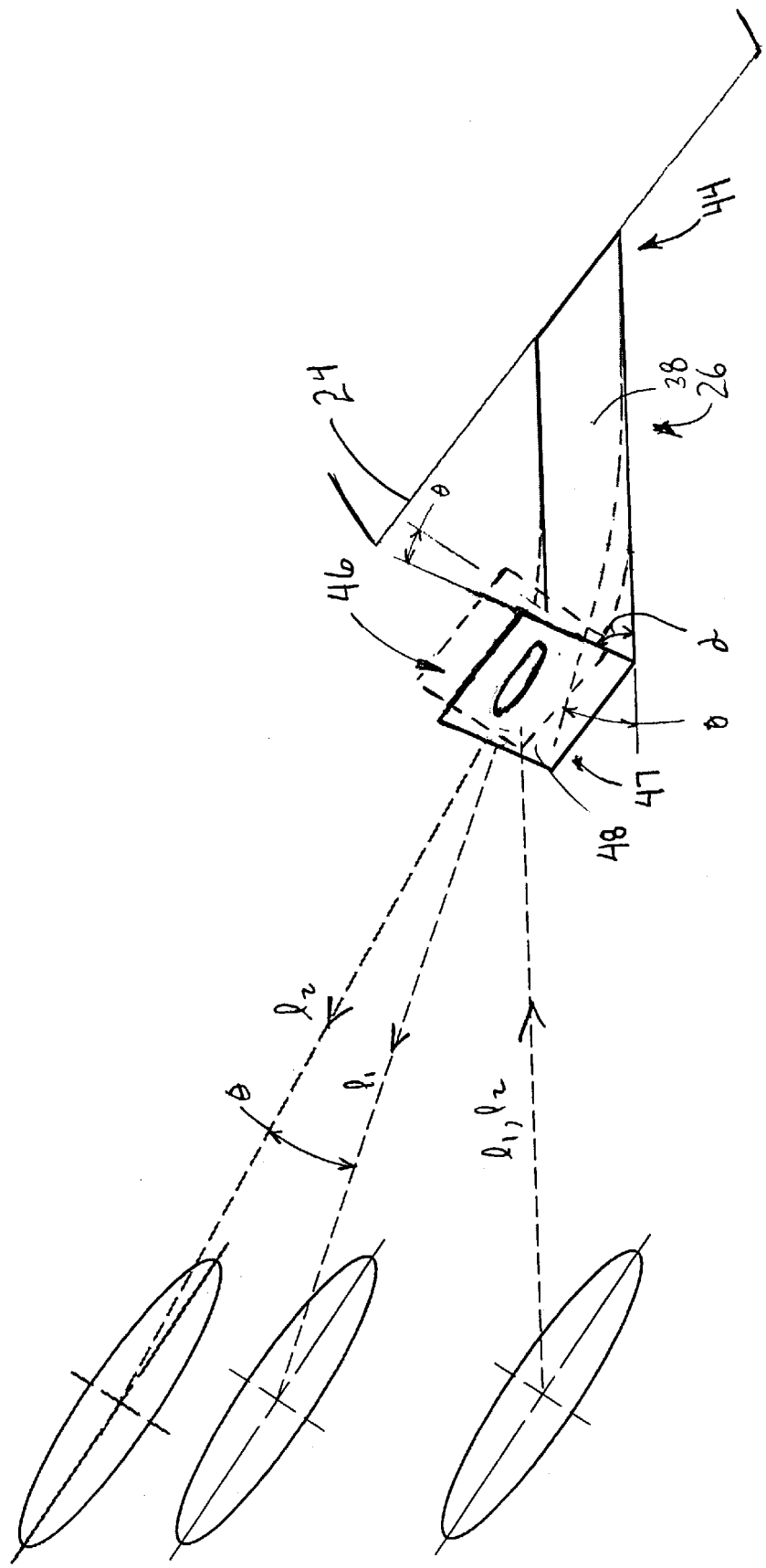
FIG. 3 is a partially broken away perspective schematic view of the light directing element shown in FIG. 2.

As shown most prominently in FIGS. 2 and 3, reflecting surface 48 is formed at second end 46 at an angle α (FIG. 3) relative to planar body 38. The laser beam output by light source 62 preferably is directed generally parallel to support surface 34 of scanner 36 such that when the laser light beam impinges upon reflecting surface 48 it is reflected towards beam steering mirror 66 at a particular angle defined by path $l_1$ as shown in FIG. 3. This is referred to hereinafter as the "side-fire" arrangement. As the tip 28 interacts with surface 30 of sample 32, cantilever 26 deflects (upwardly in FIG. 3, indicating a topographical height increase of surface 30) due to the interaction between tip 28 and the sample surface. This upward deflection of cantilever 26 causes the path of the light beam to follow the path marked $l_2$. The angle θ defined by reflected beams $l_1$ and $l_2$ directly corresponds to the amount of deflection of cantilever 26, similarly shown as θ in phantom in FIG. 3. In sum, the deflection of the cantilever converts to a change in the measured angles which is inversely proportional to the length of cantilever 26. Optical beam deflection detection apparatus 60 measures this angle of deflection of cantilever 26, rather than the actual displacement of the cantilever, so as to collect data pertaining to the sample surface.

Position sensing detector (PSD) 70 preferably is implemented with a quadrant photo-detector and uses electronic common-mode rejection to improve deflection sensitivity. Moreover, a translation stage (not shown) preferably provides centering of the reflective laser beam on the active area of detector 70. A computer (not shown) receives the quadrant detector signal and processes the data to generate a feedback signal to maintain cantilever deflection nearly constant with an actuator, as shown and described in U.S. Pat. No. 5,412,980 to Elings et al., for example. Preferably, this feedback signal is transmitted to a piezoelectric device to control the tip/sample separation during operation. More particularly, the feedback loop circuitry provides an output voltage to the Z electrode of, for example, a piezo-tube actuator that is capable of motion in the X, Y and Z directions. The piezo-tube can then be used to actuate the position of either probe assembly 22 or sample 32. Notably, the computer can also generate periodic signals to cause X-Y scanning of sample 32 to image the entire surface 30.

Further, light source 62 is preferably implemented with a diode laser that produces an elliptical output beam with an aspect ratio in the range of 5–7:1. Even though the elliptical beam can be less than optimal, the elliptical beam increases the sensitivity of the optical lever deflection apparatus 60, without saturating the photodetector 70. Further, deflection of the cantilever changes the angle of the reflected laser beam by an angle θ. This moves the point at which the laser impinges the position sensing detector 70 by a distance $D=\theta L$, where L is the separation between the cantilever and the PSD. This change in position alters the fraction of optical power incident on the individual segments of the PSD 70. Notably, the smallest detectable deflection, i.e., the sensitivity, is set by the change in the number of photons incident on the PSD segments. Note also that a cylindrical lens may also be used to produce the desired elliptical shape of the light beam.

In the preferred embodiment, cantilever 26 comprises a metal foil material while light directing element 47 is formed by manually producing a sharp bend at free end 46 by placing a razor blade near free end 36 and bending free end 46 upwardly. The angle of the bend determines the angle at which the laser beam is reflected and can be set to a predetermined angle to accommodate the location at which deflection detection apparatus 60 is disposed. Preferably, the metal used in cantilever 26 is nickel or other suitable material.

Figure 4:
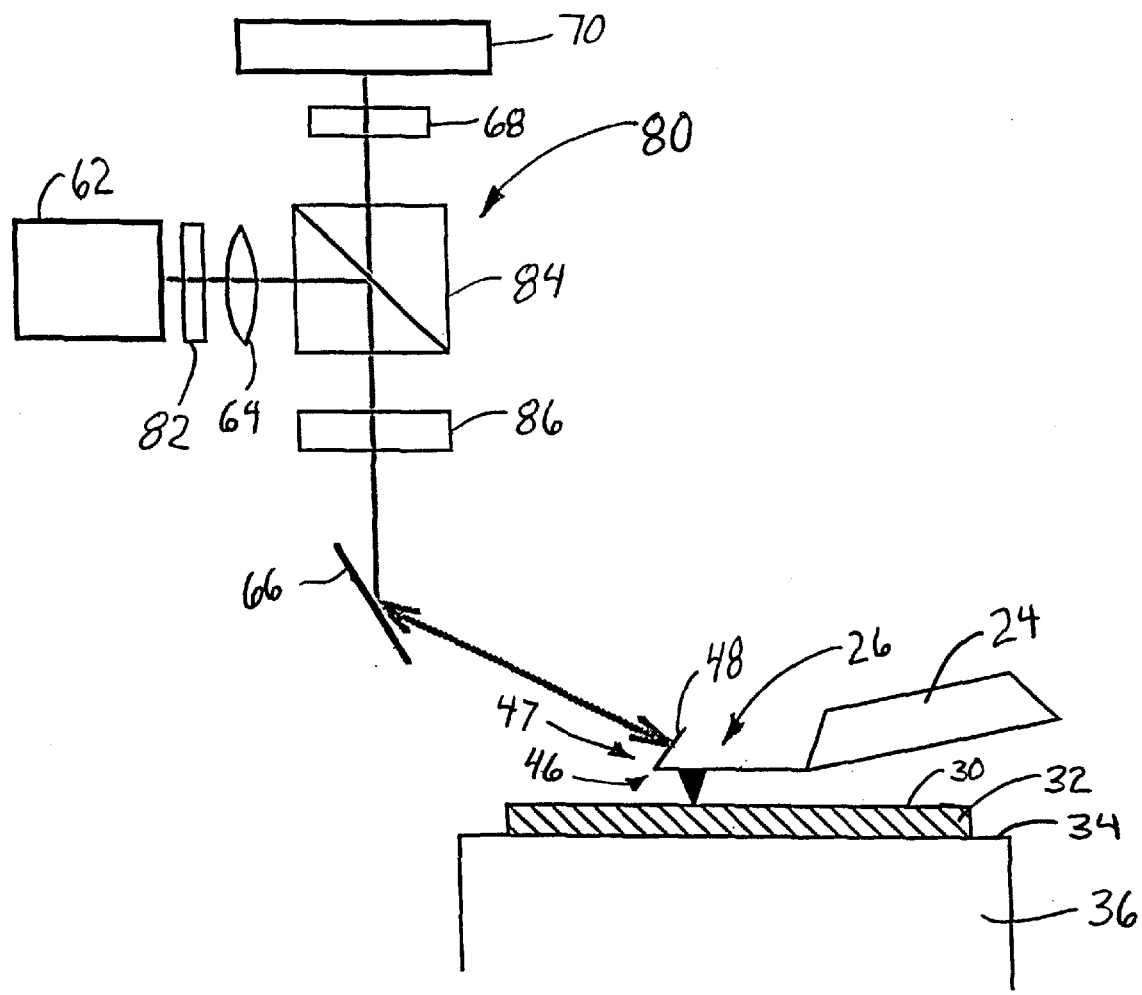
FIG. 4 is a partially broken away schematic view of an alternate embodiment of the deflection detection apparatus.

An alternate arrangement of the deflection detection apparatus is shown in FIG. 4. An AFM 80 includes a probe assembly 20 identical to that shown in FIG. 2 for scanning surface 30 of sample 32. Deflection detection apparatus 80 is utilized to monitor deflection of cantilever 26 and includes a light source 62, e.g., a laser diode, that transmits a laser beam through an optical isolator 82, through focusing lens 64 and towards a polarizing beam-splitter cube 84. Beamsplitter cube 84 directs the source laser beam through a quarter-wave plate 86 that polarizes the beam. The light beam then is reflected from a surface of a beam steering mirror 66 which is positioned or tilted to direct the light towards second end 46, and particularly towards reflecting surface 48 of cantilever 26. During an imaging operation, the reflected input light beam from surface 48 is redirected towards mirror 66 which reflects the beam back through quarter-wave plate 86 a second time. As a result, the polarization of the reflected beam is rotated 90° relative to the beam emitted by light source 62. This reflected beam is then transmitted through beam splitter cube 84 towards collector lens 68 and onto the position sensing detector 70 for determining the deflections of the cantilever.

Figure 5A:
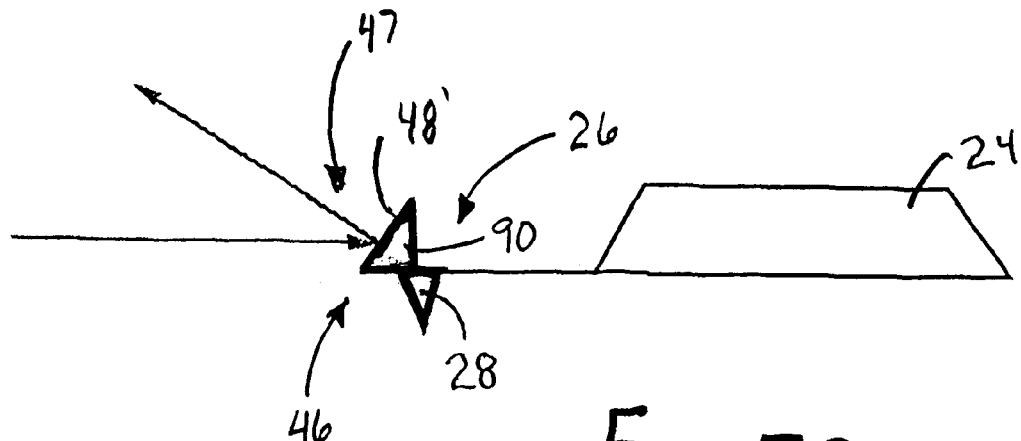
FIGS. 5a–5c illustrate various embodiments of the light directing element of the preferred embodiment.
Figure 5B:
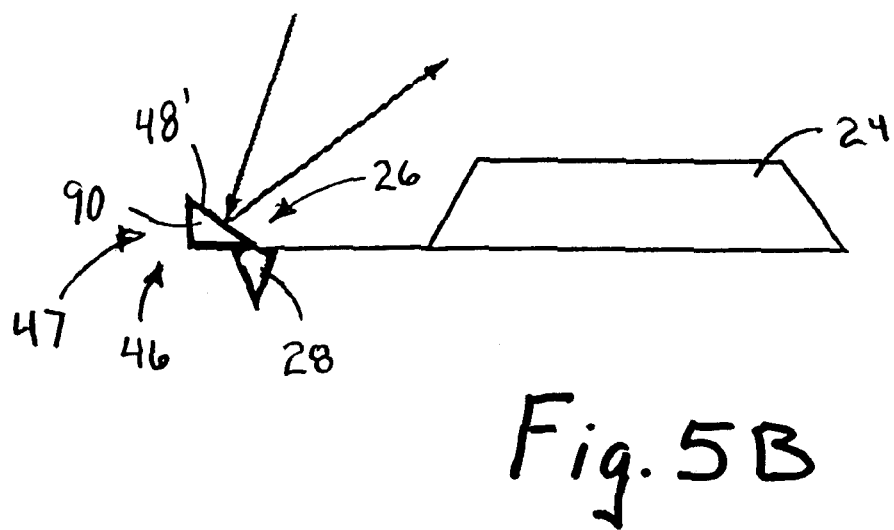
Figure 5C:
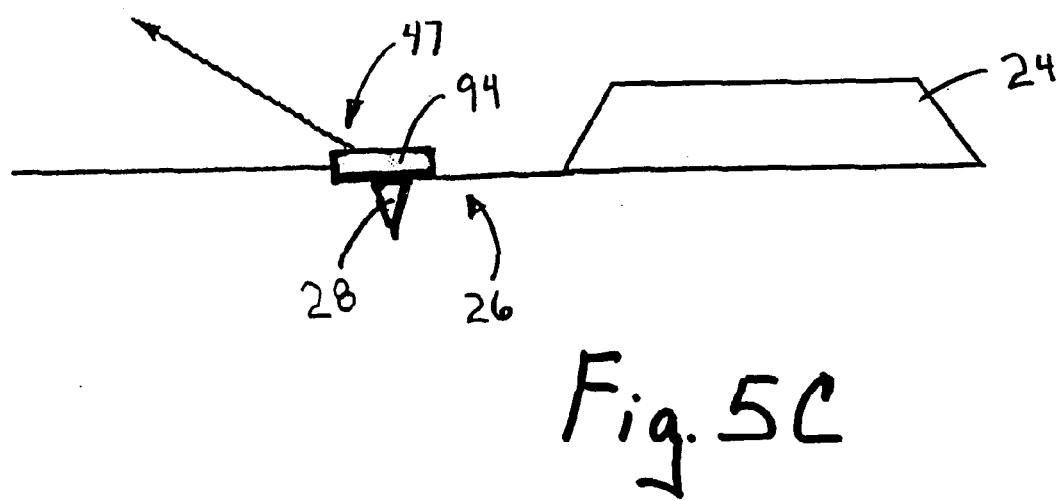

Turning next to FIGS. 5a–5c, although bending free end 46 of cantilever 26 is the preferred method of forming the light directing element 47 (i.e., light reflecting surface 48 in FIGS. 2 and 3), light directing element 47 may comprise alternate configurations. For example, as shown in FIG. 5a, light directing element 47 may comprise a separate mirror element 90, preferably having a prismatic shape. Mirror element 90 defines a reflecting surface 48' which operates identically to reflecting surface 48 in FIGS. 2 and 3. Preferably, mirror element 90 is affixed to top surface 40 of cantilever 26 with a fastening means such as high bond glue. In FIG. 5a, a light beam is directed towards reflective surface 48' in a direction generally parallel to the support surface (34 in FIG. 2) on which the sample is mounted, and operates as described previously in conjunction with FIG. 2. Turning next to FIG. 5b, mirror element 90 is positioned on free end 46 such that its reflecting surface 48' generally faces the associated deflection detection apparatus (not shown) which is disposed at an alternate location. In this embodiment, the location of the deflection detection apparatus can be selected generally anywhere within the vicinity of the AFM so as to accommodate related imaging apparatus. In FIG. 5c, light directing element 47 comprises a light conditioning optical element 94 that is either attached to or produced by a batch microfabrication process. In this embodiment, optical element 94 is a diffractive element that is designed to reflect the light back towards the deflection detection apparatus similar to that shown in FIG. 2. Optical element 94 preferably is made of a lightweight polymer and recorded with a diffraction grating having particular diffractive characteristics to appropriately direct the light.

Figure 6:
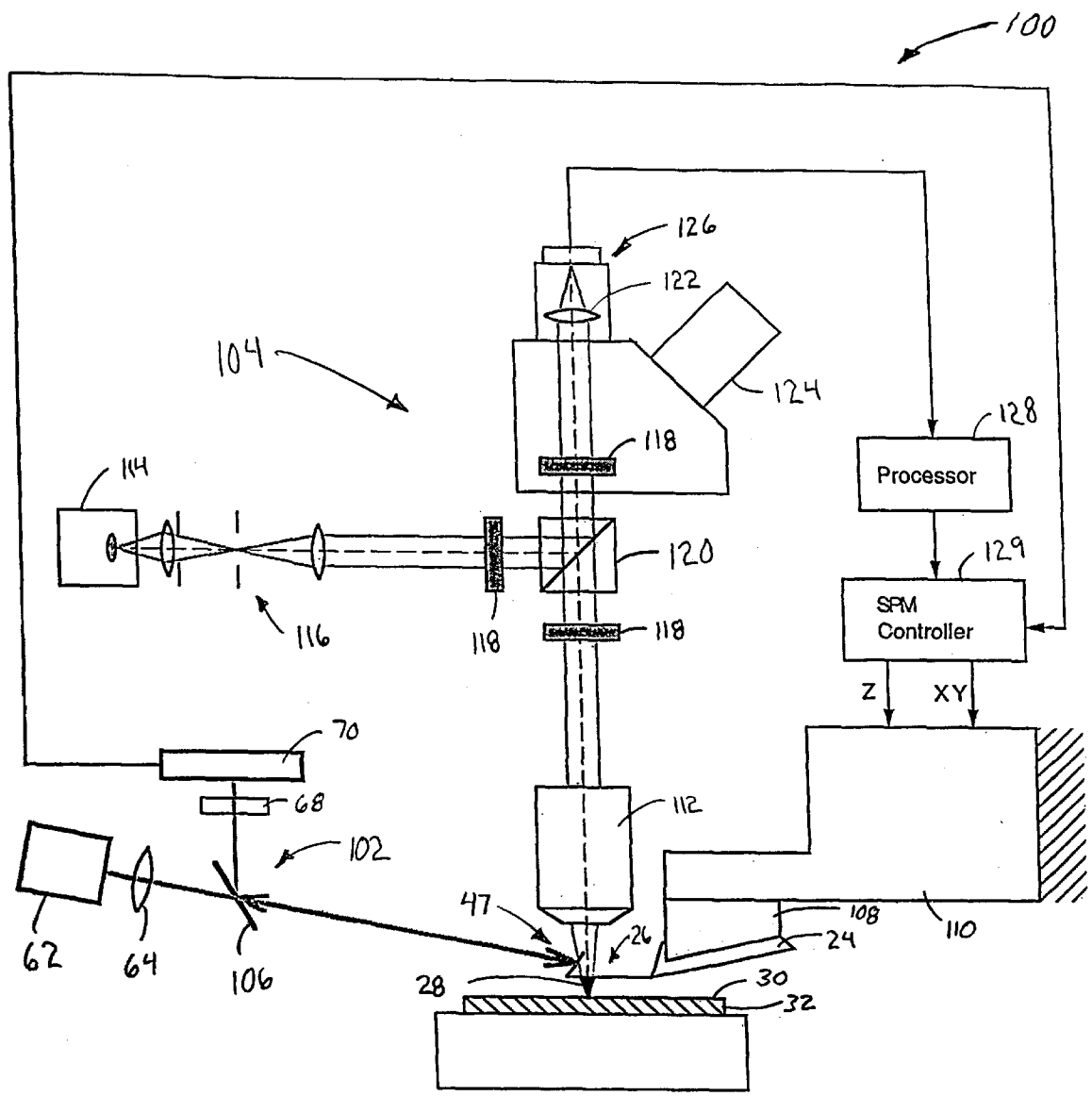
FIG. 6 is a schematic view of the atomic force microscope of the preferred embodiment, combined with an optical microscope.

Turning next to FIG. 6, another preferred embodiment of the present invention is a system 100 that combines an optical beam deflection apparatus 102 with a high resolution optical microscope 104. Deflection detection apparatus 102 of system 100 includes a light source 62 that directs a beam of light through a focusing lens 64, and thereafter, through a beam splitter 106. The portion of the light beam transmitted through the beam splitter then impinges upon tight directing element 47 of cantilever 26 and is reflected back toward beam splitter 106. As a result, the incident beam and the reflected beam follow generally the same path when interacting with beam splitter 106. The reflected beam then is directed toward the collecting lens 68 and impinges upon the position sensing detector 70 to determine the amount of deflection of the cantilever, as described previously. The embodiment shown in FIG. 6 includes a mount 108 to which cantilever substrate 24 is attached. An XYZ scanner 10 carries cantilever substrate mount 108 to scan tip 28 of cantilever 26 over surface 30 of sample 32, and operates as the actuator for the feedback loop to control tip-sample spacing, as required for AFM operation.

Next, a microscope objective 112 of optical microscope 104 is positioned above cantilever 26 to provide a view of sample 32 while the AFM generates a surface image. Notably, because the deflecting detection apparatus 102 is positioned adjacent and to the side of the sample, system 100 readily accommodates optical microscope 104. A conventional optical microscope is utilized and includes a lamp 114, Kohler illumination optics 116, filter elements 118, a beam splitter 120, a tube lens 122, an eyepiece 124 and a camera 126. Optimally, the camera signal obtained while imaging the surface of the sample is input to a processor 128 which conditions the signal and transmits the signal to a controller 129. The controller thereafter transmits appropriate control signals to XYZ scanner 110 to complete the feedback loop and thus maintain tip-sample spacing at a set-point value.

Figure 7:
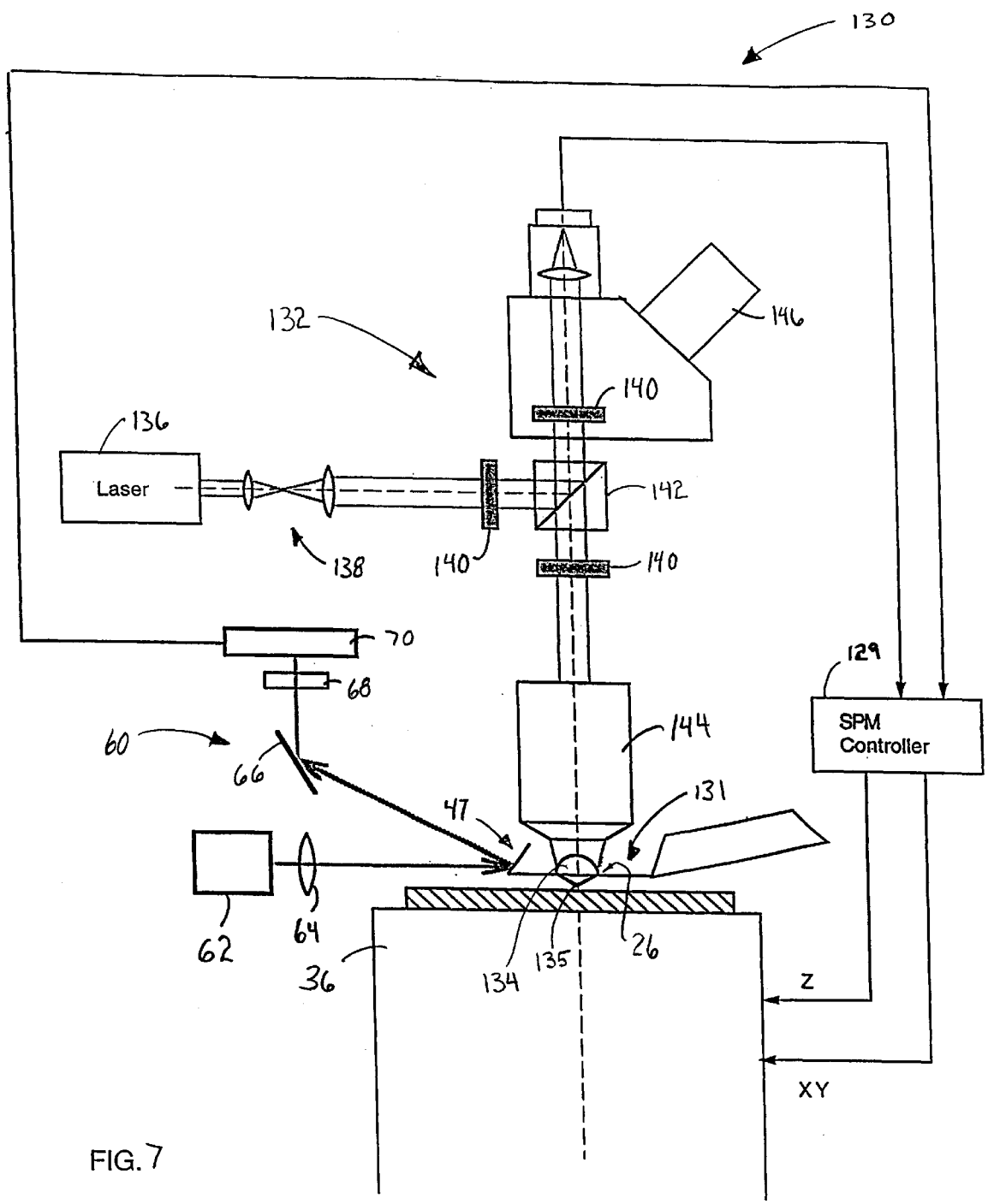
FIG. 7 is a schematic view of the atomic force microscope of the preferred embodiment, combined with a near-field scanning optical microscope.

In FIG. 7, a system 130 combines an optical beam deflection apparatus 60 with a near-field optical microscope 132. System 130 includes an SIL probe 131 having a cantilever 26, preferably made of a metal foil, and has a solid immersion lens (SIL) 134 mounted thereon in place of scanning tip 28, associated with AFM 20 shown in FIG. 2. Solid immersion lens 134 has a tip 135 and provides high resolution optical imaging, as described in Ghislain et al., simultaneously as system 130 generates an AFM image of, for example, the surface topography associated with sample 32. Notably, deflection detection apparatus 60, shown in FIG. 2, is used to generate the AFM image. In general, SIL probe 131 produces a small focal spot by increasing the numerical aperature NA=n sin (θ) to provide optical imaging with resolution which is significantly greater than the dffraction limit in air. Moreover, the profile of probe tip 135 can be modified to facilitate different optical characterizations. A sharp tip can be used to obtain high resolution images, while broad tips can determine sample height variations through interference techniques.

More particularly, in this embodiment, system 130 includes a second laser light source 136 to implement near-field scanning optical microscope 132. Laser 136 outputs a light beam towards laser optics 138 that collimate the beam and transmit the beam to a filter 140 that can be used to adjust the polarization, intensity or wavelength of the light. The light beam then passes into a beam splitter 142 which directs the laser beam into a microscope objective 144 that focuses the beam which is then input to solid immersion lens 134. In operation, as described in further detail in Ghislain et al., microscope objective 144 also collects the light returning from the sample via lens 134 and transmits the returning beam through beam splitter 142 and an additional filter 140 into an eye piece 146 or, alternatively, onto a photodetector. Thereafter, the optical signal generated thereby is input to an SPM controller 129 such that the optical image can be viewed simultaneously with the AFM deflection signal. In sum, system 130 can image both the height and optical properties of a given area on surface 30 of sample 32.

Many changes and modifications may be made within the scope of the present invention without departing from the spirit thereof. Other changes and modifications falling within the scope of the invention will become apparent from the appended claims.

What is claimed is:

1. A method of scanning probe microscopy, the method comprising:

providing a cantilever having a planar body, opposed first and second ends, and a tip disposed proximate to the second end and extending towards a surface of a sample, the sample being disposed on a support surface;

directing a beam of light towards the second end in a direction substantially parallel to the sample, the second end including a light directing element to direct the beam towards a detector; and monitoring, with the detector, a change in an angle at which the directed beam impinges upon the detector, the change caused by deflection of the cantilever in response to interaction between the tip and the sample surface.

2. The method of claim 1, wherein the beam has an elliptical cross-section.

3. The method of claim 1, wherein the light directing element is a light conditioning optical element that directs the beam towards the detector.

4. The method of claim 3 wherein the light conditioning optical element is a diffuser having a predetermined diffraction grating.

5. The method of claim 1, wherein the light directing element includes a flat reflective surface.

6. The method of claim 5 wherein a reflective layer is disposed on the flat reflective surface.

7. The method of claim 5, wherein the flat reflective surface is non-planar relative to the planar body.

8. The method of claim 7 wherein the flat reflective surface comprises a mirror affixed to the second end.

9. The method of claim 7 wherein the flat reflective surface is microfabricated integrally with the cantilever.

10. The method of claim 7, wherein the flat reflective surface is a portion of a bottom surface of the planar body.

11. The method of claim 10, wherein the cantilever is formed primarily of a metal foil and the flat reflective surface is oriented by bending the second end.

12. A method of scanning probe microscopy, the method comprising:

providing a cantilever having (1) a planar body with top and bottom surfaces, (2) opposed first and second ends, and (3) a tip disposed proximate the second end and extending towards a surface of a sample, the sample being disposed on a support surface;

directing a beam of light towards the second end so as to cause the beam to contact the bottom surface at the second end, wherein the bottom surface at the second end comprises a flat reflective surface, the flat reflective surface being non-planar relative to the planar body; and monitoring a change in an angle at which the directed beam impinges upon the detector the change caused by deflection of the cantilever in response to interaction between the tip and the sample surface.

13. A method of scanning probe microscopy, the method comprising:

providing a cantilever having a planar body, opposed first and second ends, a tip disposed proximate to the second end, the tip extending towards the surface of a sample disposed on a support surface, and a light directing element disposed generally adjacent to the second end, the light directing element having a light redirecting surface that is non-planar relative the planar body of the cantilever;

directing a beam of light towards the light directing element in a direction substantially non-perpendicular to the support surface, the light redirecting surface redirecting the beam towards a detector; and monitoring a change in an angle at which the redirected beam impinges upon the detector, the changed caused by deflection of the cantilever in response to interaction between the tip and the sample surface.

14. A deflection apparatus for a scanning probe microscope, the apparatus comprising:

a cantilever including (1) a planar body having top and bottom surfaces, (2) opposed first and second ends, and (3) a tip disposed proximate the second end and extending towards a surface of a sample, the sample being disposed on a support surface;

a light source to direct a beam of light towards the second end, wherein the second end includes a light directing element having a light redirecting surface to redirect the beam, the light redirecting surface being operably attached to and carried by the second end and being non-planar relative the planar body of the cantilever;

a detector that senses the redirected beam; and wherein a change in an angle at which the redirected beam contacts said detector is indicative of a deflection of the cantilever.

15. The apparatus of claim 14, wherein the light directing element is microfabricated integrally with the cantilever.

16. The apparatus of claim 14, further including a reflective layer disposed on the light directing element.

17. The apparatus of claim 14, wherein the light directing element is a light conditioning optical element that directs the beam towards the detector.

18. The apparatus of claim 17, wherein the light conditioning optical element is a diffuser.

19. The apparatus of claim 14, wherein the light directing element includes a flat reflective surface.

20. The apparatus of claim 19, wherein the cantilever is formed primarily of a metal foil and the flat reflective surface is formed by bending the second end such that a portion of the bottom surface of the planar body is the flat reflective surface.

21. The method of claim 19 wherein the flat reflective surface comprises a mirror affixed to the second end.

22. A deflection detection apparatus for a scanning probe microscope, the apparatus comprising:

a cantilever including (1) a planar body having top and bottom surfaces, (2) opposed first and second ends, (3) a top disposed proximate the second end and extending towards a surface of a sample, the sample being disposed on a support surface, and (4) a light directing element attached to and carried by the second end and having a light redirecting surface, the light redirecting surface being non-planar relative to the planar body of the cantilever;

a light source to direct a beam of light towards the second end in a direction substantially non-perpendicular to the sample, the light redirecting surface redirecting the beam;

a detector to sense the redirected beam; and wherein a change in an angle at which the redirected beam contacts said detector is indicative of a deflection of the cantilever.

* * * * *